(12) United States Patent
Brogårdh et al.

(10) Patent No.: US 6,418,774 B1
(45) Date of Patent: Jul. 16, 2002

(54) DEVICE AND A METHOD FOR CALIBRATION OF AN INDUSTRIAL ROBOT

(75) Inventors: Torgny Brogårdh; Henrik Jerregård; Alec Robertson, all of Västerås (SE); Alexander Slocum, Bow, NH (US); Patrick Willoughby, Cockeysville, MD (US)

(73) Assignee: ABB AB, Västerås (SE)

( * ) Notice: Subject to any disclaimer, the term of this patent is extended or adjusted under 35 U.S.C. 154(b) by 0 days.

(21) Appl. No.: 09/835,350

(22) Filed: Apr. 17, 2001

(51) Int. Cl.⁷ .............................................. G01C 17/38
(52) U.S. Cl. ....................................................... 73/1.75
(58) Field of Search .................................. 73/1.75, 1.79; 33/300, 333, 343, 365, 370, 371

(56) References Cited

U.S. PATENT DOCUMENTS

| | | | | |
|---|---|---|---|---|
| 4,505,049 A | * | 3/1985 | Kuno et al. | 33/333 |
| 4,593,475 A | * | 6/1986 | Mayes | 33/371 |
| 4,982,504 A | * | 1/1991 | Soderberg et al. | 73/1.79 |
| 5,239,855 A | * | 8/1993 | Schleifer et al. | 73/1.75 |

* cited by examiner

*Primary Examiner*—Robert Raevis

(57) ABSTRACT

A device for calibration of an industrial robot, which calibration device is adapted for being in contact during the calibration with at least one plane of reference arranged on the robot, the calibration device includes an angle measuring member arranged for measuring an angle relative to the vertical line. The device further comprises two contact elements each having a curved surface, and the contact elements are arranged for being in contact with the plane of reference.

38 Claims, 3 Drawing Sheets

DEVICE AND A METHOD FOR CALIBRATION OF AN INDUSTRIAL ROBOT

FIELD OF THE INVENTION

The present invention relates to a device for calibration of an industrial robot, which calibration device is adapted for being in contact during the calibration with at least one plane of reference arranged on the robot, the device comprising an angle measuring member arranged for measuring an angle relative to the vertical line.

The present invention further relates to an industrial robot comprising at least two links moveably attached to each other by a joint, at least one plane of reference arranged on any of the links, and a calibration device adapted for being in contact with the plane of reference during the calibration.

The present invention also relates to a method for calibration of an industrial robot.

PRIOR ART

An industrial robot can be viewed as a chain of stiff links. Two adjacent links are joined with each other so that they either are rotatable relative to each other around a rotational axis or linearly displaceable relative to each other. The first link in the chain is the base of the robot and the last link usually constitutes a tool attachment. To be able to determine the position of the robot, each joint usually is provided with an angle measuring device in the form of an encoder or a resolver indicating the position of the joint relative to a zero position. Before an industrial robot can be used it must be calibrated, which means that each of the angle measuring devices is calibrated with reference to the zero position. The robot is calibrated in the production plant before it is delivered and sometimes on site before being set to work. Thereafter, the robot is calibrated after larger reparations such as engine or arm changes.

In the patent document U.S. Pat. No. 5,239,855 a known method of calibration is shown, in which an inclinometer or some other type of instrument for measuring the inclination is used to calibrate the angle measuring devices. An inclinometer measures the angle between an object and the vertical line and can for example be an electronic spirit level. The inclinometer is placed on a plane of reference on one of the links, and generates a signal, which is a measure of the angle between the plane of reference of the link and the vertical line. Thereafter, the joint is moved in dependence of the generated signal until it has a predetermined angle relative to the vertical line. The other links are calibrated in the same way.

The placement of the planes of reference, against which the calibration device is to be attached, is predetermined and is formed by accurately machined surfaces in order to obtain a high degree of flatness. When the robot is to be calibrated, the robot is moved to a predetermined calibration configuration. In this configuration, usually at least one of the links is oriented in a direction which departs from the directions of the other links. Usually, the angles between the length axes of the links are approximately 90°. Thus, the planes of reference may have different directions depending on which link to be calibrated. The planes of reference are usually either horizontal or vertical during the calibration.

A problem with said method of calibration is that the inclinometer must be mounted on the planes of reference of the robot with a very high precision. Today the inclinometer is first put on an inclinometer plate, which is then mounted on an adapter plate. The adapter plate is then in turn attached to on the plane of reference. Depending on the direction of the plane of reference to be calibrated, different adapter plates are used today. Usually, one type of adapter plate is used for horizontal planes of reference and another type of adapter plate is used for vertical planes. The adapter plate is attached to the robot with screws. This way of attaching the inclinometer to the robot includes a large number of sources of error. Examples of sources of error are mounting errors between the adapter plate and the plane of reference of the robot, mounting errors between the inclinometer plate and the adapter plate, and errors of tolerance of the adapter plate. The fact that several different adapter plates are used also contributes to increasing the mounting error.

A common type of industrial robot comprises a base adapted for resting on a horizontal foundation and a first arm link, which is rotationally arranged relative to the base around a vertical axis. Since the axis being calibrated is essentially parallel with the vertical line, it cannot be calibrated with an inclinometer attached to the first arm link. Accordingly, a second problem with the method of calibration described above is that it cannot calibrate rotational axes parallel to the vertical line.

DESCRIPTION OF THE INVENTION

The object of the invention is to achieve a device for calibration of an industrial robot reducing the number of sources of error during the mounting of the calibration device on the plane of reference.

This object is achieved with the initially defined device characterised in that the device further comprises two contact elements each having a curved surface, and the contact elements are arranged for being in contact with the plane of reference. According to the invention the inclinometer plate is replaced by at least two contact elements. The contact area between a curved surface and a plane surface is considerably smaller than the contact area between two plane surfaces. By decreasing the contact area between the calibration device and the robot, the mounting error decreases as well. Since a measurement of an angle relative to the vertical line is carried out in relation to a straight line, the number of contact elements should be at least two for full accuracy.

In one embodiment of the invention, the curved surfaces are mainly spherical. The spherical surfaces may comprise the whole or a part of a sphere. A spherical surface is advantageous in a manufacturing point of view. For instance, balls from ordinary ball bearings may be used.

In one preferred embodiment of the invention, the number of contact elements is three. With three contact elements one has at least three contact points between the calibration device and the plane of reference of the robot, which means that the angle measuring member and the robot are fixed relative to each other with at least three degrees of freedom. A stable attachment of the calibration device against the robot is thus obtained. The total number of degrees of freedom available for the calibration device and the robot to move in relation to each other is six, (in three directions and around three axes of rotation). The more degrees of freedom the calibration device and the robot are fixed in relative to each other, the more well-defined is the measurement and the smaller becomes the measurement error.

In another embodiment of the invention, the calibration device comprises a first wall element, and the contact elements are arranged for being in contact with the first wall element and the plane of reference. The wall element, which advantageously is firmly attached to the angle measuring member, has a function corresponding to the function of the adapter plate in the prior art.

In another embodiment of the invention, the device comprises a second wall element arranged in an angle relative to the first wall element, wherein said angle essentially corresponds to the angle between two planes of reference of the robot when it stands in a calibration configuration. With such a second wall element, the same calibration device can be used for calibration of planes of reference being arranged in two different directions. Accordingly, there is no need for using different calibration devices or different adapter plates, such as in the prior art, for measuring two planes of reference with different angles relative to the vertical line. The consequence of this is that one source of error, difficult to master during calibration today, directly disappears. The second wall element is preferably arranged essentially perpendicular to the first wall element. If the wall elements are arranged perpendicularly against each other, both horizontal and vertical planes of reference can be measured with the same calibration device.

In another embodiment of the invention, the device comprises four contact elements each having a curved surface, and two of the contact elements are arranged for being in contact with the. first wall element and a first of said planes of reference, and the two others of the contact elements are arranged for being in contact with the second wall element and a second of said planes of reference. By providing both wall elements with contact elements having curved surfaces, the mounting error becomes minimal, independently of which wall element is placed against the plane of reference of the robot.

In one embodiment of the invention, the device contains a second angle measuring member arranged so that its measuring axis differs from the measuring axis of the first angle measuring member. By having two angle measuring members arranged with an angle relative to each other, it is possible to calibrate in two directions without having to rotate the angle measuring member. Advantageously, the second angle measuring member is arranged essentially perpendicular to the first angle measuring member. This implies that two axes being perpendicular to each other can be calibrated without reorienting the calibration device. This is advantageous, for example when the wrist axes are to be calibrated, i.e. the axes 4, 5, and 6, for a robot having six axes. When the robot is in its predetermined calibration configuration, the axes 4 and 6 are parallel to each other and the axes 3 and 5 are perpendicular to the axes 4 and 6. During the calibration of the wrist axes, the calibration device is placed on the outermost link, which is usually a tool attachment. Thanks to the fact that the device comprises two angle measuring members arranged perpendicular to each other, all three axes can be calibrated without moving the calibration device.

In one preferred embodiment of the invention, the calibration device comprises a magnet arranged for attaching the calibration device to the plane of reference of the robot. A magnet keeps the calibration device in place so that well-defined contact areas are obtained between the contact elements and the contact plane of the robot. Accordingly, problems with screws being tightened unequally hard are avoided.

According to one embodiment of the invention, the device comprises a notch arranged for being in contact in at least two points with the curved surface of one of the contact elements. The contact element and the notch together form a mechanical connection. A contact element, which is in contact with a notch in two points, locks two degrees of freedom between the calibration device and the robot. A contact element, which is in contact with a flat surface, only locks one degree of freedom. Thus, by using a notch instead of a smooth surface more degrees of freedom can be locked. From a manufacturing point of view it is an advantage to arrange said notch on the plane of reference of the robot, wherein a corresponding contact element is arranged in connection to the wall element, but it is also possible to arrange the notch on the surface of the wall element and the corresponding contact element on the plane of reference of the robot.

In one embodiment of the invention, the device comprises a notch shaped as a groove having two angled contact surfaces, which are arranged for being in contact in at least two points with the curved surface of one of the contact elements. A groove allows the contact element to move along the groove and accordingly the calibration device may follow any movement in the axis intended to be measured.

In another embodiment of the invention, the calibration device comprises a notch shaped like a prism having three angled contact surfaces, which are arranged for being in contact in at least three points with the curved surface of one of the contact elements. Such a prism locks the angle measuring device relative to the plane of reference in three degrees of freedom.

In a further embodiment of the invention, the calibration device comprises two grooves and two contact elements arranged so that the contact elements are movable in the grooves, wherein one groove and one contact element together constitute a mechanical connection. Two connections lock the calibration device and the robot in four degrees of freedom.

The robot comprises two links moveably attached to each other by a joint. The calibration device is adapted for being positioned across the joint so that a displacement of the links relative to each other becomes measurable. By placing at least one connection on each side of the joint, the calibration device. is enabled to follow the movement of any of the links, and the movement of one link relative to the other link can be measured as a change in inclination of the calibration device. Accordingly, it is possible to measure the change of angle of an axis which is parallel with the vertical axis, and thus the axis can be calibrated. This method may advantageously also be used for calibrating axes not parallel with the vertical axis. Such a movement assumes, of course, that the contact elements are arranged movably along the grooves. Advantageously, the calibration device comprises three grooves arranged in different directions. With three grooves in different directions, all six degrees of freedom become locked, which means that the construction becomes stable. To achieve maximum stability, the grooves are arranged so that their mutual angles are essentially 120°. Maximum stability means minimum measuring errors.

Another object of the invention is to provide an industrial robot having an calibration device in which the number of sources of error during the calibration is reduced. This object is achieved with the initially defined industrial robot characterised in that the calibration device further comprises two contact elements each having a curved surface, and the contact elements are arranged for being in contact with the plane of reference.

A further object of the invention is to provide a method for calibration of an industrial robot for which the number of sources of error is reduced. This object is achieved by a method comprising the step of bringing a calibration device into contact with a plane of reference on the robot by bringing at least two curved surfaces into contact with at least one surface, measuring an angle corresponding to the angle between the plane of reference and the vertical line and calibrating the robot in dependence of said angle.

BRIEF DESCRIPTION OF THE DRAWINGS

The present invention will now be explained by different embodiments described as examples with reference to the appended drawings.

DESCRIPTION OF EMBODIMENTS

Figure 1:
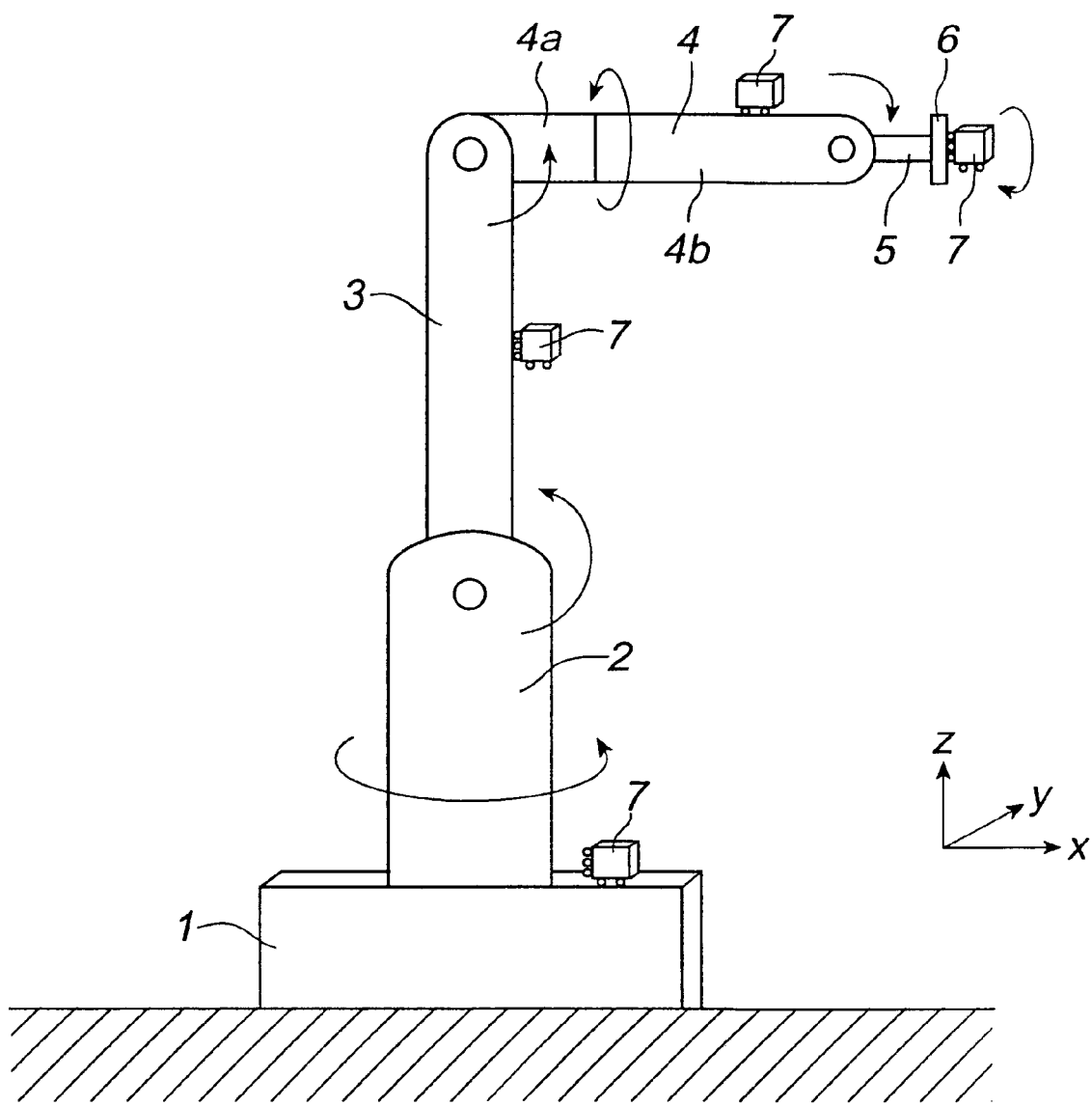
FIG. 1 shows an industrial robot in a calibration configuration.
Figure 2:
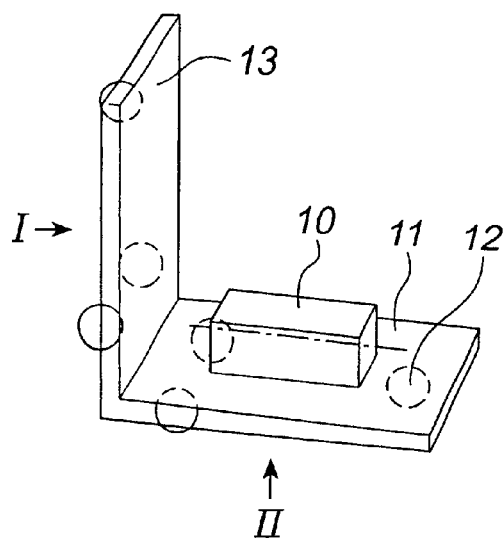
FIG. 2 shows a first embodiment of a calibration device according to the invention.
Figure 3:
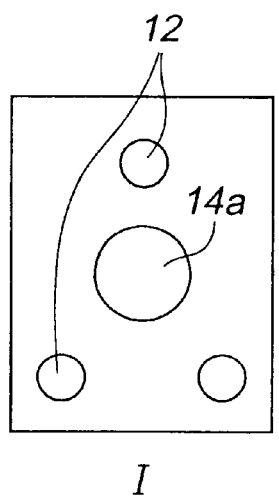
FIG. 3 shows a side view of the calibration device in FIG. 2.
Figure 4:
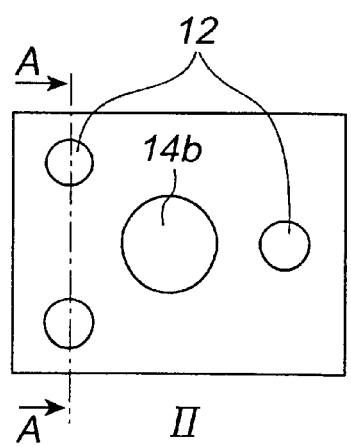
FIG. 4 shows a view from below of the calibration device in FIG. 2.
Figure 5:
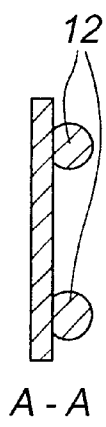
FIG. 5 shows a cross-sectional view of the calibration device along the line A—A in FIG. 3.

FIG. 1 shows an example of an industrial robot standing in a calibration configuration. The robot comprises a base 1, which is firmly mounted on a foundation. The robot further comprises a support 2, which is rotatable relative to the base 1 around a first vertical axis. In the top end of the support 2, a first robot arm 3 is rotatably mounted around a second horizontal axis. In the outer end of the first arm, a second arm 4 is rotatably mounted relative to the first arm around a third axis. The second robot arm 4 comprises two parts, 4a and 4b, and the outer part 4b is rotatable relative to the inner part 4a around a fourth axis coinciding with the length axis of the second arm 4. The second arm 4 supports in its outer end a so-called robot hand 5, which is rotatable around a fifth axis, which is perpendicular to the length axis of the second arm 4. The robot also comprises a tool attachment 6. The outer part of the robot hand and thus the tool attachment 6, is rotatable relative to the inner part of the robot hand around a sixth axis. For each of the axes of the robot, there is a level indicator giving a signal which is a measure of the present rotational angle of the axis. The output signals from the level indicator is transmitted to the control system.

When the robot stands in its calibration configuration, as shown in FIG. 1, the first arm 3 is placed parallel with the first axis, i.e. parallel with the vertical line, the second arm 4 is placed perpendicular to the first arm 3 and the robot hand 5 is placed parallel with the length axis of the second arm, i.e. perpendicular to the vertical line. On an industrial robot there is usually a plurality of especially formed planes of reference intended for being used during calibration of the robot. In FIG. 1a, calibration device 7 according to the invention is shown arranged on some of these planes of reference. A first plane of reference on the robot is arranged on the base 1, a second plane of reference is arranged on the first arm 2, a third plane of reference is arranged on the second arm 4, and a fourth and last plane of reference is arranged on the tool attachment 6.

The FIGS. 2, 3, 4, and 5 show an embodiment of a calibration device according to the invention. The calibration device comprises an angle measuring member 10 in the form of an inclinometer, which measures the angle of an object relative to the vertical line. An inclinometer functions as an electronic spirit level and measures the inclination angle around an axis perpendicular to the vertical line. In the figures, the measuring axis is perpendicular to the long side of the inclinometer. The inclinometer 10 is arranged in fixed connection to a first wall element 11. The inclinometer is arranged on one side of the wall element 11. On the other side of the wall element, three contact elements 12 are arranged. The wall element has the shape of a rectangular plate. The contact elements 12 are arranged as the corners of a triangle and have a curved form. In this embodiment, the contact elements have the shape of a sphere. The contact elements are intended to bear on the contact surfaces of a plane of reference on the robot, or on a plate having a corresponding function, which is mounted on the robot. The contact element does not necessarily have to be spherical; it is enough that the surfaces are curved so that it only has one contact area with a plane surface.

A spherical contact element bearing on a plane surface has one contact spot with the surface and locks the calibration device relative to the surface in one degree of freedom. Accordingly, three contact elements bearing on a plane surface lock the calibration device relative to the surface in three degrees of freedom. The calibration device further comprises a second wall element 13, which is arranged perpendicularly to the first wall element 11. Both wall elements 11, 13 are in contact with each other along one side each. The second wall element 13 comprises in the same way as the first wall element three spherical contact elements 12, intended to be in contact with the planes of reference of the robot.

For the purpose of fixing the calibration device against the planes of reference of the robot, the calibration device comprises two magnets, 14a and 14b, which are arranged on the first 11 and the second 13 wall element. In order to obtain a calibration device being simple to handle and for protecting the inclinometer, it is advantageous to provide the device with four additional wall elements arranged so that they, together with the other two wall elements 11, 13, form a cube. Thus, the, calibration device obtains the shape of a cube, as shown in FIG. 1.

During the calibration process, the calibration device 7 is placed with the first wall element 11 against the plane of reference on the base 1 of the robot. A reference angle is read and stored in the control system of the robot. Thereafter, each of the axes are calibrated by placing the calibration device 7 on the different planes of reference, and the inclinometer is read and the difference between the read angle and the angle of reference is calculated in the control system. Thereafter, the control system orders the axis being calibrated to move in dependence on the calculated difference, so that the axis ends up in its calibration position.

During the calibration of the second axis of the robot, the calibration device 7 is placed with the second wall element 13 against the first arm 3 of the robot. During calibration of the third and the fourth axis, the calibration device 7 is placed with the first wall element 11 against the second arm 4 of the robot and for calibration of the wrist axes, i.e. the axes 5 and 6, the calibration device 7 is placed with the second wall element 13 against the tool attachment 6. Thus, the same calibration device can be used to calibrate axes which are perpendicular to each other. It should be pointed out that it is also possible to calibrate the axes 3 and 4 while the calibration device 7 is placed with the second wall element 13 against the tool attachment 6. Then measurements are made for different angles of the axes 4 and 5.

In order to obtain a more well defined connection between the calibration device and the robot, one or several notches are arranged on the planes of reference of the robot. The notch is intended for locking a contact element in more than one degree of freedom. These notches can either be formed directly in a plane of reference of the robot or in a plane of reference of a reference plate which is mounted on the surface of the robot. Preferably the robot is provided with such reference plates during manufacturing of the robot. The notches on the plate of reference or on the robot constitute a part of the calibration device.

Figure 6:
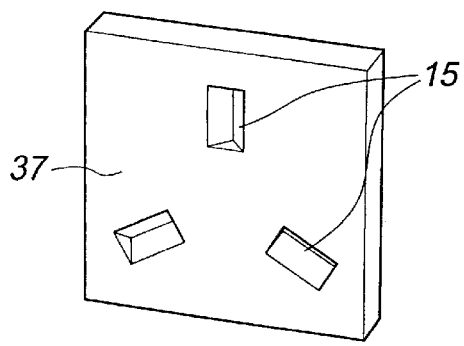
FIG. 6 shows a plate having three grooves intended to be connected to three contact elements of the calibration device.

FIG. 6 shows an example of a reference plate with a plane of reference 37, which has been provided with three notches in the form of grooves 15. The grooves 15 are arranged so that none of them is parallel with the others. The grooves 15 have a mainly V-shaped cross-section, which means that when a contact element 12 is inserted into one of the grooves 15, it makes contact with two contact surfaces with one contact area per contact surface. A calibration device with three contact elements 12 and three grooves 15 arranged on the robot thus locks the device against the robot in all six degrees of freedom. To obtain maximum stability, the grooves are arranged with three angles, each of 120°. In this embodiment, the contact elements 12 comprise either a continuously curved surface which is so shaped that it has only one contact area per contact surface of the grooves or the contact element comprises two curved surfaces each shaped so that it only has one contact area per contact surface.

Figure 7:
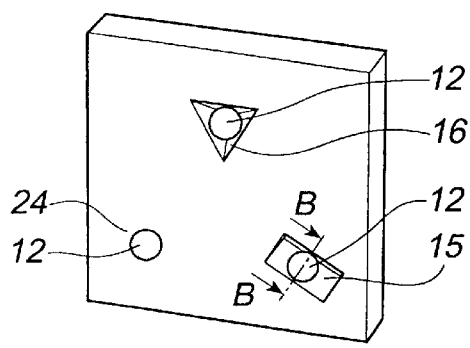
FIG. 7 shows a plate having a groove, a triangular prism, and a surface intended to be in contact with three contact elements of the calibration device.

FIG. 7 shows an alternative embodiment, in which one of the notches constitutes a triangular prism 16. The prism 16 has three contact surfaces which incline towards its bottom, and the contact element 12 being inserted into the prism obtains three contact areas with the prism. The reference plate shown in FIG. 7 belongs to a calibration device with three contact elements 12, which are intended to be in contact with the triangular prism 16 (with three contact surfaces) during the calibration, a groove 15 (with two contact surfaces) and a simple contact surface 24 on the reference plate. Such a calibration device is also locked against the robot in six degrees of freedom.

Figure 8:
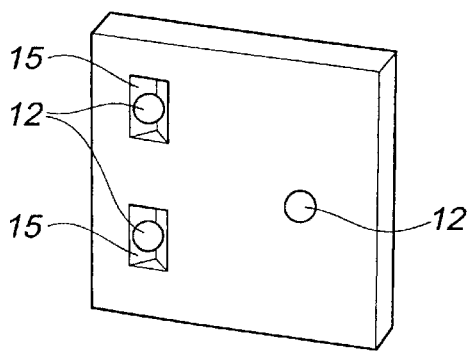
FIG. 8 shows a plate having two grooves and a surface intended to be in contact with three contact elements.
Figure 9:
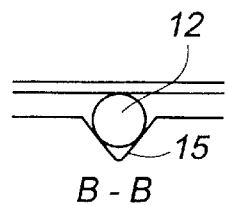
FIG. 9 shows a cross-section of the calibration device along the line B—B in FIG. 7.

FIG. 8 shows a further alternative embodiment, which comprises two notches consisting of two grooves, 15a, 15b, and a simple contact surface on the reference plate. This embodiment locks five degrees of freedom between the inclinometer and the robot and the position upwards/downwards of the inclinometer becomes undefined and has to be determined by the operator. This embodiment has the advantage that it is simple to manufacture.

In the embodiments of the invention described above, the contact elements are fixedly attached against any of the wall elements and the notches are arranged on the surface of the robot or on a reference plate. In another embodiment of the invention, the contact elements may instead be fixedly attached to the robot or to the attachment plate. The contact elements are then arranged for being in contact with the surface of the wall elements or to one or several notches in the surface of the wall element. It is also possible to loosely arrange the contact elements between the robot and the wall elements, i.e. they are neither fixed to the wall element nor to the robot.

Figure 10:
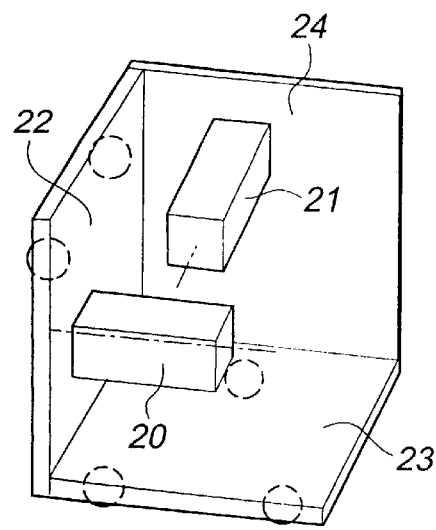
FIG. 10 shows a second embodiment of a calibration device according to the invention which has two angle measuring devices arranged in different angles.

FIG. 10 shows a calibration device according to the invention, which comprises a first angle measuring member 20 and a second angle measuring member 21. The angle measuring members are constituted by two inclinometers, which are arranged so that their measuring axes are mainly perpendicular to each other. The calibration device comprises three wall elements 22, 23, and 24. The first angle measuring member 20 is arranged at the first wall 22 and the second angle measuring member 21 is arranged at the third wall 24. The first 22 and the second 23 wall element are provided with three contact elements each, which are intended for being in contact with the planes of reference of the robot. Thanks to the fact that the measuring axes of the angle measuring members are arranged perpendicularly to each other, it is possible to measure the rotational angles of two perpendicular robot axes without reorienting the calibration device.

Figure 11:
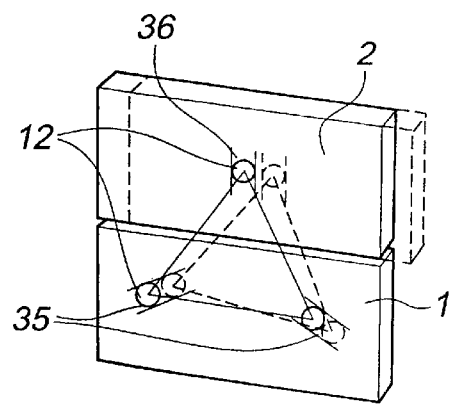
FIG. 11 shows a third embodiment of a calibration device according to the invention.

FIG. 11 shows an embodiment of a calibration device, which makes calibration of an axis parallel with the vertical line possible. The calibration device further comprises three grooves 35, 36 arranged for receiving the contact elements 12 during the calibration procedure. The grooves 35, 36 are shaped so that a contact element 12 is in contact with a groove in two contact areas and so that the contact element is movable along the groove.

The robot described above comprises a plurality of stiff links, for example the base 1, the robot arms 3, 4 and the tool attachment 6, which are rotatable relative to each other around a number of axes. Two such links are moveably joined with each other by means of a joint. In order for an axis parallel with the vertical line to be calibrated, the calibration device in this embodiment is arranged for being positioned across said joint. This means that at least one groove or contact element is arranged on each side of said joint, i.e. on each of the links. In the embodiment shown in FIG. 11, two of the grooves 35 are arranged on the base 1 of the robot and one of the grooves 36 is arranged on the support 2 of the robot. Thus, the grooves are arranged on each side of the joint between the base 1 and the support 2.

When the support 2 is moved in relation to the base 1, the groves 35 and 36 are moved relative to each other, thus causing a movement of the contact elements 12 in the grooves 35 and 36. The inclinometers 20, 21 follow the movement by turning around an axis perpendicular to the plane of reference which contains the grooves 35 and 36. The change of angles are read from the angle measuring members 20 and 21. Accordingly, it is possible to calibrate the first axes of the robot. Such a calibration device could also be used for calibration of the other robot axes.

In FIG. 11 the plane of reference 37 according to FIG. 6 is divided into two planes of reference 38, 39. The grove 36 is provided in the upper plane of reference 38 and the two grooves 35 is provided in the lower plane of reference 39. A corresponding apportioning can be done at the contact surface configurations in the FIGS. 7 and 8. Thereby, it is possible to locate the single contact surface 24 either to the upper plane of reference or to the lower plane of reference. When the current axis of the robot is turned around, both the planes of reference will be laterally displaced relative to each other and the inclinometer will be turned around its measuring axes when the contact elements 12 on the wall is moved relative to the contact surfaces.

Figure 12:
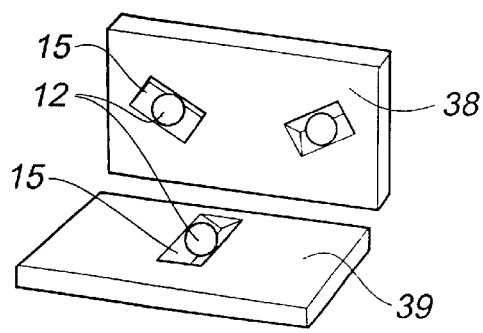
FIG. 12 shows a further embodiment of the calibration device according to the invention.

FIG. 12 shows another arrangement having the upper 38 and the lower 39 plane of reference angled relative to each other. During the measuring, contact elements from both the first wall element 11 and the second wall element 13 are used. In the same way may the contact surface configurations shown in FIGS. 7 and 8 be used for measuring a displacement between two perpendicular planes of reference. This is particularly interesting when, due to the robot construction, it is difficult to find space enough for two parallel planes of reference according to FIG. 11.

The present invention is not limited to the embodiments disclosed but may be varied and modified within the scope of the following claims. For example the notch which is arranged for receiving the contact element, could be a hole having straight walls and the contact element is resting against the edge around the hole during the calibration.

What is claimed is:

1. A device for calibration of an industrial robot, which calibration device is adapted for being in contact during the calibration with at least one plane of reference arranged on the robot, the calibration device comprising:
   an angle measuring member arranged for measuring an angle relative to the vertical line, wherein the device further comprises:
   at least two contact elements each having a curved surface, and the contact elements are arranged so that the device is in contact with the plane of reference through said curved surfaces.

2. A device according to claim 1, wherein the curved surfaces are bulging so that each curved surface protrudes toward the plane of reference.

3. A device according to claim 1, wherein the curved surfaces are mainly spherical.

4. A device according to claim 1, wherein the device comprises three contact elements.

5. A device according to claim 1, wherein the device further comprises a first wall element, wherein the contact elements are arranged to be in contact with the first wall element and said plane of reference.

6. A device according to claim 5, wherein the device further comprises a second wall element arranged in an angle relative to the first wall element, and that said angle essentially corresponds to the angle between two planes of reference of the robot when the robot is in its calibration configuration.

7. device according to claim 6, wherein the second wall element is provided essentially perpendicular to the first wall element.

8. A device according to claim 6, wherein the device further comprises four contact elements each having a curved surface, wherein two of the contact elements are arranged for being in contact with the first wall element and a first of said planes of reference and two of the contact elements are arranged for being in contact with the second wall element and a second of said planes of reference.

9. A device according to claim 1, further comprising a second angle measuring member arranged so that its measuring axis differs from the measuring axis of the first angle measuring member.

10. A device according to claim 9, wherein the second angle measuring member is arranged essentially perpendicular to the first angle measuring device.

11. A device according to claim 1, further comprising a magnet provided for attaching the device to the robot.

12. A device according to claim 1, further comprising a notch adapted for being in contact in at least in two points with the curved surface of one of the contact elements.

13. A device according to claim 12, wherein said notch is shaped as a groove having two angled contact surfaces and the groove is adapted for being in contact in at least two points with the curved surface of one of the contact elements.

14. A device according to claim 13, further comprising two grooves and two contact elements, which are arranged so that the contact elements are moveable in the grooves, wherein a groove and an contact element together constitute a mechanical connection.

15. A device according to claim 14, wherein the robot comprises two links moveably attached to each other by a joint, the device is adapted for being positioned across the joint, whereby a displacement of the links relative to each other becomes measurable.

16. A device according to claim 15, wherein at least one groove or contact element is positioned on each side of said joint.

17. A device according to claim 14, further comprising three grooves arranged in different directions.

18. A device according to claim 17, wherein the grooves are arranged so that the angles between the grooves are essentially 120°.

19. A device according to claim 12, wherein said notch is shaped as a prism having three angled contact surfaces, and the prism is adapted for being in contact in at least three points with the curved surface of one of the contact elements.

20. A device according to claim 12, wherein said notch is arranged in the plane of reference.

21. A device according to claim 12, wherein said notch is arranged in a wall element.

22. An industrial robot comprising at least two links moveably attached to each other by a joint, at least one plane of reference arranged on any of the links, and a calibration device adapted for being in contact with the plane of reference during the calibration, the calibration device comprising:
   an angle measuring member arranged for measuring an angle relative to the vertical line, wherein the calibration device further comprises:
   two contact elements each having a curved surface, and the contact elements are arranged so that the device is in contact with the plane of reference through said curved surfaces.

23. An industrial robot according to claim 22, wherein the curved surfaces are bulging so that each curved surfaces protrude toward the plane of reference.

24. An industrial robot according to claim 22, wherein the calibration device comprises a first wall element, and the contact elements are arranged to be in contact with the first wall element and said plane of reference.

25. An industrial robot according to claim 24, wherein a notch is arranged in the wall element.

26. An industrial robot according to claim 24, wherein the calibration device further comprises a second wall element arranged in an angle relative to the first wall element, and that said angle essentially corresponds to the angle between two planes of reference of the robot when the robot is in its calibration configuration.

27. An industrial robot according to claim 22, further comprising a notch adapted for being in contact in at least in two points with the curved surface of one of the contact elements.

28. An industrial robot according to claim 27, wherein said notch is arranged in a wall element.

29. An industrial robot according to claim 27, wherein said notch is arranged in the plane of reference.

30. An industrial robot according claim 27, wherein said notch is shaped as a groove having two angled contact surfaces and the groove is adapted for being in contact in at least two points with the curved surface of one of the contact elements.

31. An industrial robot according to claim 30, further comprising two grooves and two contact elements, which are arranged so that the contact elements are moveable in the grooves, and a groove and an contact element together constitute a mechanical connection.

32. An industrial robot according to claim 31, further comprising two planes of reference arranged on each side of said joint and the planes of reference and the device are arranged so that the calibration device is adapted for being positioned across the joint, whereby a displacement of the links relative to each other becomes measurable.

33. An industrial robot according to claim 32, wherein at least one groove and contact element is positioned on each side of said joint.

34. A method for calibrating an industrial robot including at least two links moveably attached to each other by a joint, at least one plane of reference arranged on any of the links, the method comprising:

bringing a calibration device into contact with the plane of reference by bringing at least two curved surfaces into contact with at least one plane surface;

measuring an angle corresponding to the angle between the plane of reference and the vertical line; and calibrating the robot in dependence of said angle.

35. The method according to claim 34, wherein the curved surfaces are bulging so that each curved surface protrudes toward the plane of reference.

36. A method according to claim 31, wherein at least one of the curved surfaces is brought into contact with a notch in the surface.

37. A method according to claim 31, wherein a magnetic force is attaching the calibration device to the robot.

38. A method according to claim 31, wherein the calibration device is brought into contact with two planes of reference arranged on each side of said joint, moving at least one of the links and measuring an angle corresponding to the displacement of the links relative to each other and calibrating the robot in dependence of said angle.

* * * * *